United States Patent
Schuster et al.

(10) Patent No.: US 6,681,252 B1
(45) Date of Patent: Jan. 20, 2004

(54) SYSTEM AND METHOD FOR INTERCONNECTING PORTABLE INFORMATION DEVICES THROUGH A NETWORK BASED TELECOMMUNICATION SYSTEM

(75) Inventors: Guido M. Schuster, Des Plaines, IL (US); Ikhlaq S. Sidhu, Vernon Hills, IL (US); Frederick D. Dean, Chicago, IL (US); Ronnen Belkind, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/406,152

(22) Filed: Sep. 27, 1999

(51) Int. Cl.[7] ............................................... G06F 13/00
(52) U.S. Cl. ...................................................... 709/227
(58) Field of Search ...................... 455/556.2; 379/93.05, 379/93.06, 93.07, 93.24; 709/200, 227, 230, 231, 232, 233, 238

(56) References Cited

U.S. PATENT DOCUMENTS

| 4,313,035 A | 1/1982 | Jordan et al. |
| 4,953,198 A | 8/1990 | Daly et al. ..................... 379/61 |

(List continued on next page.)

FOREIGN PATENT DOCUMENTS

| DE | 198 13 179 A 1 | 9/1999 |
| EP | 0 578 374 A1 | 6/1993 |
| EP | 0 704 788 A2 | 4/1996 |
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |
| WO | WO98/00988 | 1/1998 |
| WO | WO 98/04065 | 1/1998 |

(List continued on next page.)

OTHER PUBLICATIONS

3COM SIP Solutions 1.0 benefits brochure. (4 total pages).
Sidhu, Ikhlaq and Bezaitis, Andrew, Eat or be eaten, www.americasnetwork.com/issues/99issues/991101/991191_eat.htm, printed May 10, 2000 (6 total pages).

(List continued on next page.)

*Primary Examiner*—Robert B. Harrell
(74) *Attorney, Agent, or Firm*—McDonnell Boehnen Hulbert & Berghoff

(57) ABSTRACT

A personal information device (PID) is coupled to an IP Telephony phone in order to provide end-to-end connectivity to another PID through a network. The architecture disclosed includes a pair of internet-enabled phones that are able to establish a call session using a Session Initiation Protocol (SIP) and a Session Description Protocol (SDP). Each phone is also provided with an interface configured to communicate with a PID. Each PID is registered to a corresponding internet-enabled phone using each PID user's SIP URL. The user of a first PID connected to a first phone requests a call to a SIP URL corresponding to the user of the second PID that is connected to a second phone. The SIP URL for the user of the second PID is resolved to the network address of the second phone and connection is established between the first and second phones. The connection includes a media stream for transferring data between each of the PIDs. A data object transmitted by the first PID through its interface with the first phone is transmitted to the second phone through the media stream of the connection between the first and second phones. The data object received by the second phone is transmitted to the second PID through the interface between the second phone and the second PID.

37 Claims, 10 Drawing Sheets

U.S. PATENT DOCUMENTS

| | | | |
|---|---|---|---|
| 5,428,663 A | 6/1995 | Grimes et al. | |
| 5,448,623 A | 9/1995 | Wiedeman et al. | |
| 5,497,339 A | 3/1996 | Bernard | 364/705.05 |
| 5,557,658 A | 9/1996 | Gregorek et al. | 379/67 |
| 5,563,937 A | 10/1996 | Bruno et al. | |
| 5,606,594 A | 2/1997 | Register et al. | 379/58 |
| 5,646,945 A | 7/1997 | Bergler | |
| 5,727,057 A | 3/1998 | Emery et al. | 379/211 |
| 5,732,074 A | 3/1998 | Spaur et al. | |
| 5,732,216 A | 3/1998 | Logan et al. | |
| 5,742,905 A | 4/1998 | Pepe et al. | 455/461 |
| 5,838,665 A | 11/1998 | Kahn et al. | 370/260 |
| 5,850,433 A | 12/1998 | Rondeau | 379/201 |
| 5,875,405 A | 2/1999 | Honda | |
| 5,894,473 A | 4/1999 | Dent | |
| 5,894,595 A | 4/1999 | Foladare et al. | 455/414 |
| 5,915,008 A | 6/1999 | Dulman | 379/201 |
| 5,918,172 A | 6/1999 | Saunders et al. | 455/404 |
| 5,930,700 A | 7/1999 | Pepper et al. | |
| 5,933,778 A | 8/1999 | Buhrmann et al. | 455/461 |
| 5,938,757 A | 8/1999 | Bertsch | |
| 5,960,340 A | 9/1999 | Fuentes | |
| 5,991,394 A | 11/1999 | Dezonno et al. | |
| 6,006,272 A | 12/1999 | Aravamudan et al. | |
| 6,031,904 A | 2/2000 | An et al. | |
| 6,075,992 A | 6/2000 | Moon et al. | |
| 6,161,134 A | 12/2000 | Wang et al. | |
| 6,163,598 A | 12/2000 | Moore | |
| 6,175,860 B1 | 1/2001 | Gaucher | |
| 6,216,158 B1 | 4/2001 | Luo et al. | |
| 6,240,097 B1 | 5/2001 | Weslock et al. | |
| 6,301,609 B1 | 10/2001 | Aravamudan et al. | |
| 6,308,201 B1 | 10/2001 | Pivowar et al. | |
| 6,411,965 B2 | 6/2002 | Klug | |

FOREIGN PATENT DOCUMENTS

| | | |
|---|---|---|
| WO | WO98/10538 | 3/1998 |
| WO | WO 99/45687 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/05078 A2 | 7/2000 |

OTHER PUBLICATIONS

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

International Search Report for PCT Application Ser. No. PCT/US00/26618, Dated Feb. 19, 2001.

Pepper, David J. et al., *The Call Manager System: A Platform for Intelligent Telecommunications Services*, Speech Communication, vol. 23, (1997), pps. 129–139.

Dalgic, Ismail et al., *True Number Portability and Advanced Call Screening in a SIP–Based IP Telephony System*, IEEE Communications Magazine, vol. 37, No. 7, (Jul. 1999), pps. 96–101.

International Search Report for PCT Application Ser. No. PCT/US00/26094, Dated Jan. 31, 2001.

International Search Report for PCT Application Ser. No. PCT/US00/26594, Dated Feb. 6, 2001.

Watanabe, H. et al., *Development of the BTRON–BrainPad*, Proceedings 13th Tron Project International Symposium, Online!, (Dec. 4–7, 1996), pps. 95–103.

Gessler, Stefan et al., *PDAs as Mobile WWW Browsers*, Computer Networks and ISDN Systems, vol. 28, No. 1, (Dec. 1995), pps. 53–59.

International Search Report for PCT Application Ser. No. PCT/US00/26650, Dated Feb. 19, 2001.

International Search Report for PCT Application Ser. No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pps. 151–157.

International Search Report for PCT Application Ser. No. PCT/US00/26649, Dated Feb. 6, 2001.

Hansson, Allan et al., *Phone Doubler—A Step Towards Integrated Internet and Telephone Communities*, Ericsson Review, No. 4, 1997, pps. 142–152.

Zellweger, Polle T. et al. *An Overview of the Etherphone System and Its Applications*, Xerox Palo Alto Research Center (Mar. 1988), pps. 160–168, XP 000617541.

Terry, Douglas B. et al. *Managing Stored Voice In the Etherphone System*, Xerox Palo Alto Research Center vol. 1, (Feb. 1998), pps. 3–27, XP 000032477.

Terry, Douglas B. et al. *Managing Stored Voice In The Etherphone System*, Operating Systems Review (SIGOPS), US, ACM Head Quarter, New York, NY. vol. 21, No. % (Nov. 8, 1987), pps. 103–104, XP 000005196.

U.S. patent application Ser. No. 09/451,388, Schuster et al., filed Nov. 30, 1999.

U.S. patent application Ser. No. 09/406,231, Schuster et al., filed Sep. 27, 1999.

U.S. patent application Ser. No. 09/515,365, Schuster et al., filed Feb. 29, 2000.

U.S. patent application Ser. No. 09/406,320, Schuster et al., filed Sep. 27, 1999.

U.S. patent application Ser. No. 09/515,797, Schuster et al., filed Feb. 29, 2000.

U.S. patent application Ser. No. 09/515,364, Schuster et al., filed Feb. 29, 2000.

U.S. patent application Ser. No. 09/405,283, Schuster et al., filed Sep. 27, 1999.

U.S. patent application Ser. No. 09/515,798, Schuster et al., filed Feb. 29, 2000.

U.S. patent application Ser. No. 09/584,924, Schuster et al., filed May 31, 2000.

U.S. patent application Ser. No. 09/515,969, Schuster et al., filed Feb. 29, 2000.

U.S. patent application Ser. No. 09/406,322, Schuster et al., filed Sep. 27, 1999.

U.S. patent application Ser. No. 09/405,981, Schuster et al., filed Sep. 27, 1999.

U.S. patent application Ser. No. 09/406,128, Schuster et al., filed Sep. 27, 1999.

U.S. patent application Ser. No. 09/515,387, Schuster et al., filed Feb. 29, 2000.

U.S. patent application Ser. No. 09/515,970, Schuster et al., filed Feb. 29, 2000.

U.S. patent application Ser. No. 09/515,796, Schuster et al., filed Feb. 29, 2000.

U.S. patent application Ser. No. 09/406,151, Schuster et al., filed Sep. 27, 1999.

U.S. patent application Ser. No. 09/406,298, Schuster et al., filed Sep. 27, 1999.

U.S. patent application Ser. No. 09/406,066, Schuster et al., filed Sep. 27, 1999.

U.S. patent application Ser. No. 09/515,795, Schuster et al., filed Feb. 29, 2000.

U.S. patent application Ser. No. 09/516,269, Schuster et al., filed Feb. 29, 2000.

U.S. patent application Ser. No. 09/515,366, Schuster et al., filed Feb. 29, 2000.

U.S. patent application Ser. No. 09/470,879, Schuster et al., filed Dec. 22, 1999.

U.S. patent application Ser. No. 09/707,708, Schuster et al., filed Nov. 7, 2000.

U.S. patent application Ser. No. 09/677,077, Schuster et al., filed Sep. 29, 2000.

U.S. patent application Ser. No. 09/584,927, Schuster et al., filed May 31, 2000.

U.S. patent application Ser. No. 09/726,993, Schuster et al., filed Nov. 30, 2000.

U.S. patent application Ser. No. 09/728,833, Schuster et al., filed Nov. 30, 2000.

SYSTEM AND METHOD FOR INTERCONNECTING PORTABLE INFORMATION DEVICES THROUGH A NETWORK BASED TELECOMMUNICATION SYSTEM

BACKGROUND OF THE INVENTION

A. Field of the Invention

The present invention is related to a method and system for providing communication services over a network. In particular, the present invention relates to a system and method for exchanging data related to personal information device (PID) services over a telephony network.

B. Description of the Related Art

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more popular CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data. CLASS feature data is typically transmitted between local Class-5 switches using the Signaling System #7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

Data network telephones and the data network (e.g. Internet) system in which they operate, however, lack a substantial infrastructure and service providers for providing telephone service.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that enables connected users to transmit user data, such as graphical data, or application-related data (e.g. email, contacts data, calendar data, interactive game data, etc.), to each other across a telephony network using PIDs (Portable Information Devices) that may be linked to network communication devices. The system according to some embodiments of the present invention addresses concurrent voice and user data transmissions between users.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

The following references to patent applications filed concurrently herewith are incorporated be reference:

"System and Method for Controlling Telephone Service Using a Wireless Personal Information Device" to Schuster, et al.

"System and Method for Advertising Using Data Network Telephone Connections" to Schuster, et al.

"System and Method for Providing User-Configured Telephone Service in a Data Network Telephony System" to Sidhu, et al.

"System and Method for Accessing a Network Server Using a Portable Information Device Through a Network Based Telecommunication System" to Schuster, et al.

"System and Method for Enabling Encryption on a Telephony Network" to Schuster, et al.

"System and Method for Using a Portable Information Device to Establish a Conference Call on a Telephony Network" to Schuster, et al.

"System and Method for Associating Notes with a Portable Information Device on a Network Telephony Call" to Schuster, et al.

"System and Method for Providing Shared Workspace Services Over a Telephony Network" to Schuster, et al.

"System and Method for Providing Service Provider Configurations for Telephones in a Data Network Telephony System" to Schuster, et al.

The following additional references are also incorporated by reference herein:

"Multiple ISP Support for Data Over Cable Networks" to Ali Akgun, et al.

"Method and System for Provisioning Network Addresses in a Data-Over-Cable System" to Ali Akgun, et al., Ser. No. 09/218,793.

"Network Access Methods, Including Direct Wireless to Internet Access" to Yingchun Xu, et al., Ser. No. 08/887,313

A. PID-Enabled Data Network Telephony System

Figure 1:
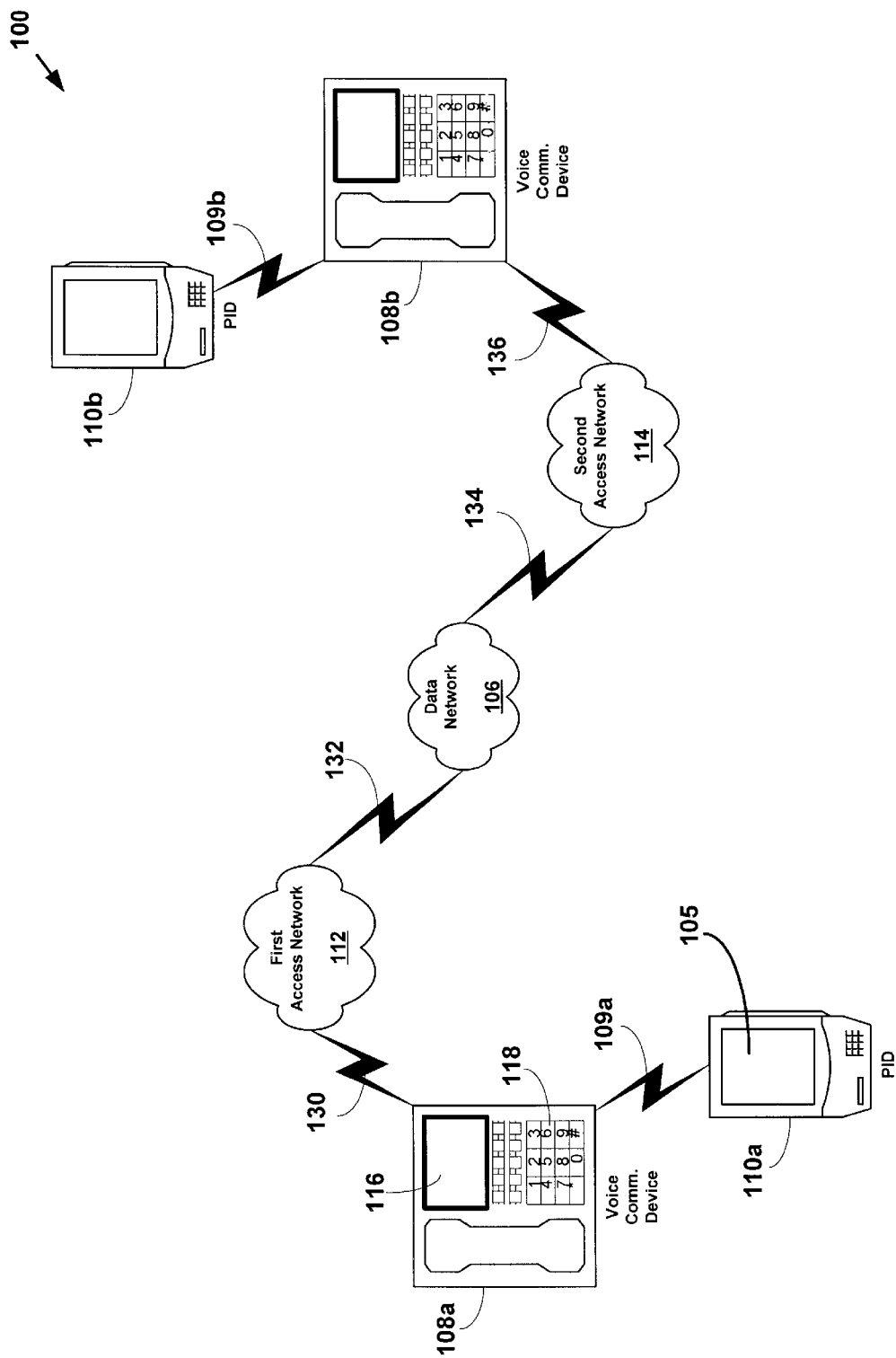
FIG. 1 is block diagram of a network telephony system according to one embodiment of the present invention.

FIG. 1 is a block diagram showing an exemplary embodiment of a system 100 for exchanging mixed media messages according to one embodiment of the present invention. The system includes a data network 106. A first voice communication device 108a linked to a first access network 112 via connection 130 may communicate over the data network 106 by connecting via the first access network 112. A second voice communication device 108b is linked to a second access network 114 through connection 136 and may communicate over the data network 106 by connecting via the second access network 114

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office.

The voice communication devices 108a–b (described further below with reference to FIG. 3) typically include a voice input, a voice output and a voice processing system. The voice processing system converts voice sound to digital data signals that are communicated on a voice connection over the data network. The voice processing system also converts digital data signals received from the voice connection to voice sound. The voice communication devices 108a–b typically include a central processing unit and memory to store and process computer programs. Additionally, each voice communication device 108a–b typically includes a unique network address, such as an IP address, in memory to uniquely identify it to the data network 106 and to permit data packets to be routed to the device.

A first PID 110a linked to the first voice communication device 108a via connection 109a may communicate over the data network 106 by connecting via the first access network 112. A second PID 110b linked to the second voice communication device 108b via connection 109b may communicate over the data network 106 by connecting via the second access network 114. The PIDs 110a–b each contain user attributes stored in a user information data base. The user attributes may contain such information as a user identifier, schedule information, and other information that is associated with a user of the PID 110a or 110b. The PIDS 110a–b each include a user interface allowing a user to easily enter and retrieve data. In a preferred embodiment, the user interface includes a pressure-sensitive display that allows a user to enter input with a stylus or other device. An example of a PID with such an interace is a PDA (Personal Digital Assistant), such as one of the Palm™ series of PDAs offered by 3Com® Corporation. The PIDs 110a–b may include other functionality, such as wireless phone or two-way radio functionality.

Links 109a–b are point-to-point links, and may entirely or partially wireless, or they may be hard-wired connections. Each of the links 109a–b is preferably a wireless link, such as an infrared link specified by the Infrared Data Association (IrDA) (see irda.org for further information) or a radio frequency (RF) link such as the Bluetooth system (see www.bluetooth.com for further information). However, the point-to-point link can also be a hardwired connection, such as an RS-232 serial port.

In one embodiment, the voice communication device 108a includes a handset with a receiver and transmitter similar or identical to handsets of traditional circuit-switched telephones. A console on which the handset sits may include the voice processing system, a display 116, and a keypad 118.

In a preferred embodiment, a portion of the voice communication device 108a utilizes an NBX 100™ communication system phone offered by 3Com® Corporation. In alternative embodiments, the voice communication device 108a may include any device having voice communications capabilities. For example, a personal computer having a microphone input and speaker output may also be used to implement the voice communication device 108a. Other configurations are also intended to be within the scope of the present invention.

The details relating to operation of the voice communication devices 108a and 108b depend on the nature of the data network 106 and the nature of the access networks 112, 114 connecting the voice communication devices 108a and 108b to each other and/or to other network entities. The access networks 112, 114 typically include any high bandwidth network adapted for data communications, i.e. a network having greater than 64,000 bits-per-second (bps) bandwidth. The access networks 112, 114 may link to the voice communication devices 108a–b using an Ethernet LAN, a token ring LAN, a coaxial cable link (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112, 114 may also include the PSTN and link the voice communications devices 108a–b by an analog modem. Further details regarding specific implementations are described below, with reference to FIGS. 2 through 10.

B. System for Providing PID Data Exchange Using a Data Network Telephony System

One advantage of the PDA-Enabled Data Network Telephony System 100 in FIG. 1 is that it may be used to exchange PID data. In one embodiment, the PIDs 110a is able to accept and process PID data from a user through a user interface on the PID 110a. The PID data may include any data used by the PID, such as graphical data, email, calendar data, contacts data (e.g. business card data), interactive game data. The PID data can be communicated across the link 109a to the voice communication devices 108a for transport across the first access network 112, the data network 106, and the second access network 114 to the voice communication device 108b. The PID 110b can receive the PID data across the link 109b for display on the PID 110b. A voice-over-data channel for communicating voice-over-data can concurrently exist with this communication of the PID data over a graphical data channel. In this way, a user of the PID 110a can communicate PID data to a user of the PID 110b while voice signals are communicated between the voice communication device 108a and the voice communication device 108b.

1. Local Area Network As An Exemplary Access Network

Figure 2:
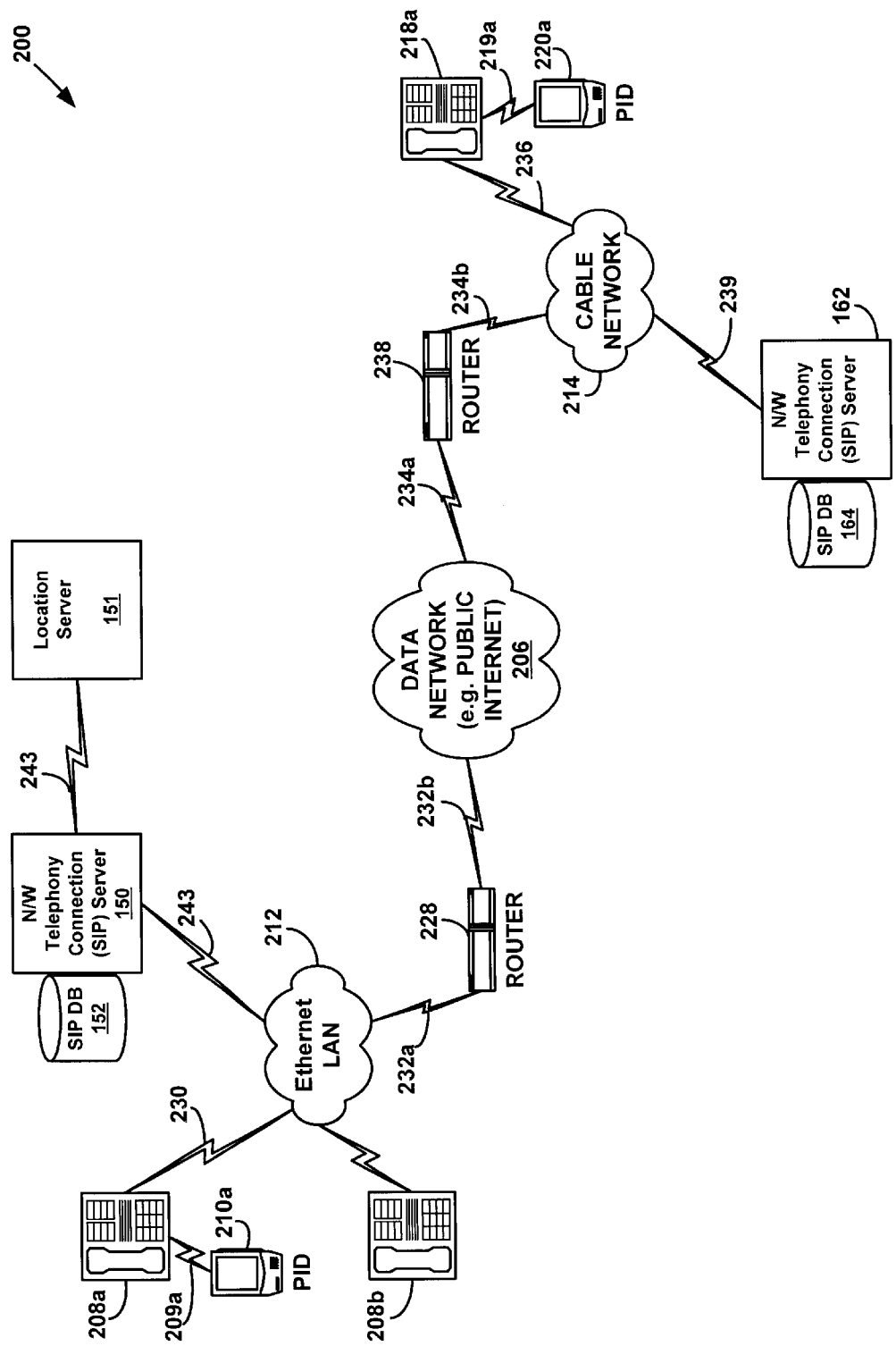
FIG. 2 is a block diagram showing a system for exchanging data related to portable informnation device (PID) services on a telephony system according to an exemplary embodiment of the present invention.

FIG. 2 is a block diagram showing one example of the system 100 of FIG. 1 for providing PID data exchange according to the present invention. The system 200 in FIG. 2 includes a local area network 212, connected to a data network 206 by a first router 228. A cable network 214 is connected to the data network 206 by a second router 238. Those of ordinary skill in the art will appreciate that while FIG. 2 illustrates the access networks as the local area network 212 and the cable network 214, any other type of network may be used. For example, the local area network 212 and/or the cable network 214 may be replaced by ISDN, DSL, or any other high-speed data link.

The local area network 212 provides data connectivity to its network elements, such as a first data network telephone 208a, a second data network telephone 208b, and a first network telephony connection server 150. The local area network 212 in FIG. 2 is an Ethernet LAN operating according to the IEEE 802.3 specification, which is incorporated by reference herein, however, any other type of local area network may be used. The local area network 212 uses the router 228 to provide the data network telephone 208a and the first network telephony connection server 150 with access to the data network 206. For example, the router 228 may perform routing functions using protocol stacks that include the Internet Protocol and other protocols for communicating on the Internet.

The first network telephony connection server 150 provides telephony registration, location and session initiation services for voice connections in which its members are a party. A user may register for telephony service with an administrator of the first network telephony connection server 150 and receive a user identifier and a telephone identifier. The user identifier and telephone identifier may be sequences of unique alphanumeric elements that callers use to direct voice connections to the user. The first network telephony connection server 150 registers users by storing user records in a first registration database 152 in response to registration requests made by the user.

The call setup process and the user and telephone identifiers preferably conform to requirements defined in a call management protocol. The call management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a data communications channel. The data communications channel incorporates other data transport and data formatting protocols, and preferably includes well-known data communications channels typically established over the Internet.

The call management protocol used in FIG. 2 is the Session Initiation Protocol (SIP), which is described in M. Handley et al., "SIP: Session Initiation Protocol," IETF RFC 2543, March 1999, incorporated by reference herein, however, any other such protocol may be used. Other protocols include H.323, the Media Gateway Control Protocol (MGCP), MEGACO, etc.

The network telephony connection server 150 may be used to provide telephony service for mobile users. A user may be registered to use the first network telephone 208a (which is identified by its telephone identifier), but move to a location near the second network telephone 208b. The user may re-register as the user of the second network telephone 208b. Calls that identify the user by the user's user identifier may reach the user at the second network telephone 208b.

2. Cable Network As An Exemplary Access Network

The system 200 in FIG. 2 also shows a cable network 214 connected to the data network 206 by a router 238. The cable network 214 provides data network access to its network elements, which in FIG. 2 include a third data network telephone 218a and a second network telephony connection server 162. The users of the data network telephone 218a connected to the cable network 214 may communicate over the data network 206 with the users of the data network telephones 208a–b connected to the local area network 212.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

3. Providing Telephony Services

The second network telephony connection server 162 is preferably a SIP-based server that performs call initiation, maintenance and teardown for the data network telephone 218a connected to the cable network 214. The second network telephony connection server 162 may be similar or identical to the first network telephony connection server 150 connected to the local area network 212.

The system 200 shown in FIG. 2 permits the data network telephones 208a–b connected to the local area network 212 to communicate with the data network telephone 218a connected to the cable network 214. The system shown in FIG. 2 uses SIP in order to establish, maintain, and teardown telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection server 150 and 162. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several data network telephones at once until somebody takes the call. Registrar servers are used to record the SIP address (the SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the local area network 212, the central registrar/proxy server, such as the first network telephony server 150, is the primary destination of all SIP messages trying to establish a connection with users on the local area network 212. Preferably, the first network telephony server 150 is also the only destination advertised to the SIP clients outside the LAN 212 on behalf of all the SIP clients residing on the LAN 212. The network telephony server 150 relays all SIP INVITE messages to the appropriate final destination (or another SIP proxy), based on a database lookup using the first SIP database 152. It allows all mobile clients to register with their current locations.

Similarly, the second network telephony server 162 is the primary destination of all SIP messages trying to establish a connection with the data network telephone 218a connected to the cable network 214. Preferably, the second network telephony server 162 is also the only destination advertised to the SIP clients outside the cable network 214 on behalf of all the SIP clients (e.g. data network telephones) residing on the cable network 214. The second network telephony server 162 relays all SIP INVITE messages to the appropriate final destination (or another SIP proxy), based on a database lookup using the second SIP database 164.

The data network telephones 208a–b and 218a in the system 200 preferably have pre-programmed device identifiers (e.g. phone numbers), represented as SIP-URL's that are of the form sip: user@domain. An example is sip: 8475551212@3Com.com. After power-up, each of the data network telephones 208a–b and 218a sends a SIP REGISTER message to the default registrar, such as the network telephony servers 150 and 162. When a call arrives at one of the network telephony servers 150 or 162 for any of the registered SIP URLs, the server will forward the call to the appropriate destination. If a data network telephone is moved to a new location, all calls to the associated SIP URL will still be properly routed to that device. In other words, the system in FIG. 2 provides device mobility in the sense that calls will "follow" the data network telephone according to its SIP URL. This is especially useful if the data network telephone 208a–b or 218a is running the DHCP (Dynamic Host Configuration Protocol) so that when the location is changed, the IP address is also automatically changed.

An advantage of the system in FIG. 2 is that once the call is established between data network telephones, the data network 206 provides data connectivity for a plurality of data communications channels. For example, the data network telephones 208a and 218a can communication voice signals as voice-over-data packets on a voice-over-data channel. The data network telephones 208a and 218a can also communicate graphical data (or other PID data) as graphical data packets on a graphic data channel. For example, the graphical data may be communicated to and from the PIDs 210a and 220a across links 209a and 219a to the data network telephones 208a and 218a, where graphical data is packetized and depacketized as part of the process for communicating the graphical data packets across the data network 206 and any access networks, such as the Ethernet LAN 212 and the cable network 214.

4. The Data Network Telephones

The data network telephones 208a–b are preferably telephones that include an Ethernet communications interface for connection to an Ethernet port. The Ethernet phones in FIG. 2 support the Internet Protocol (IP), using an IP address that is either statically configured or obtained by access to a Dynamic Host Configuration Protocol (DHCP) server.

Figure 3:
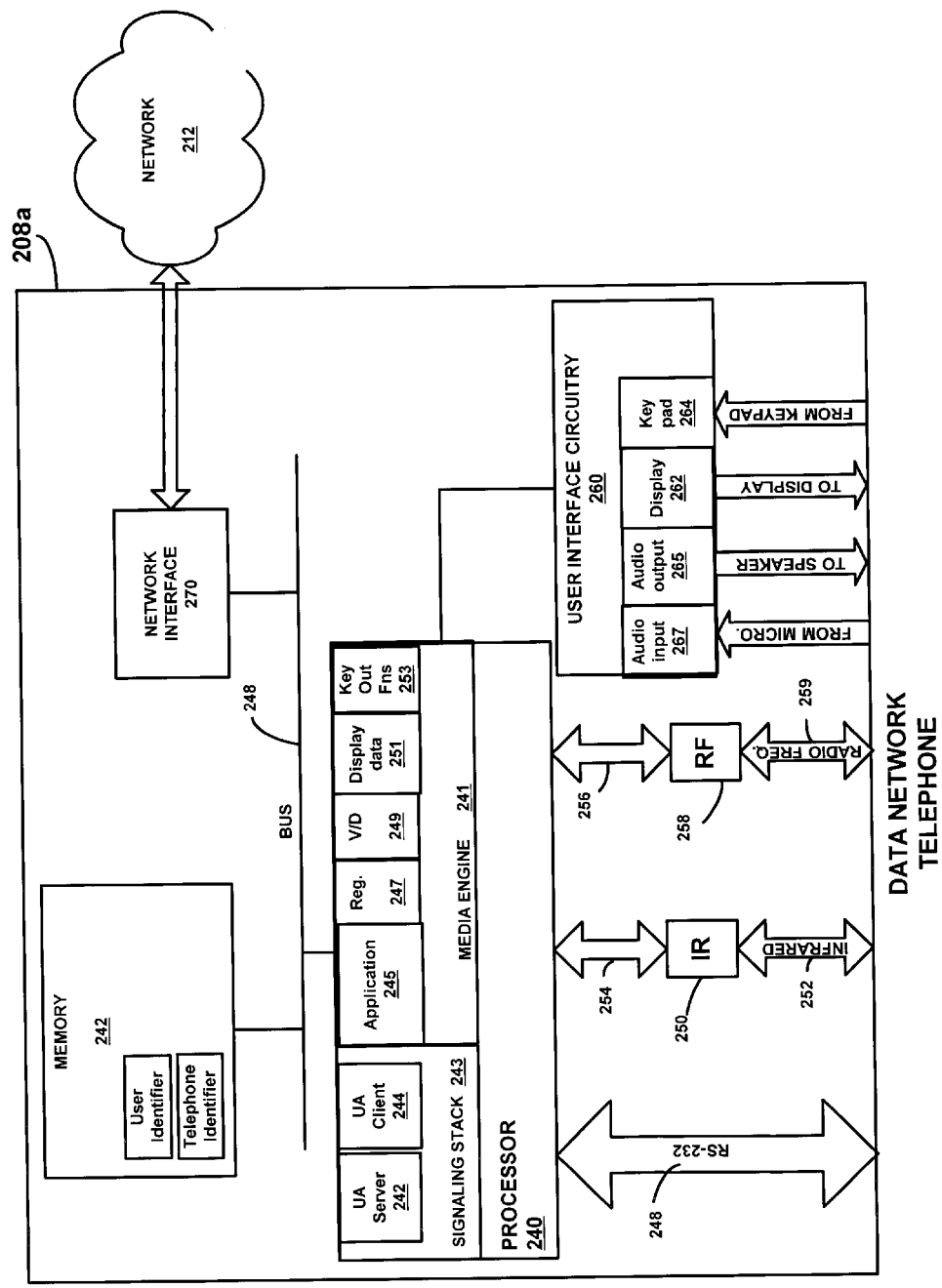
FIG. 3 is a block diagram of a data network telephone according to an exemplary embodiment of the present invention.

FIG. 3 is a block diagram showing the data network telephone 208a connected to the local area network 212 in FIG. 2. The data network telephone 208a in FIG. 3 is connected to the network 212 by a network interface 270. The network interface 270 may, for example, be a network interface card, and may be in the form of an integrated circuit. A bus 248 may be used to connect the network interface 270 with a processor 240 and a memory 242. Also connected to the processor are user interface circuitry 260 and three alternative link interfaces to a PID, such as the PID 210a.

A first link interface 248 includes an RS-232 serial connection and associated coupling hardware and mechanisms. The first alternative link interface 248 may, for example, be a docking cradle for a PDA (Personal Digital Assistant), in which information can be transferred between the PDA and the data network telephone 208a. The second alternative link interface comprises a first connection 254, such as an RS-232 connection, along with infrared circuitry 250 for converting signals into infrared output and for accepting infrared input. An infrared interface 252 may also be included within the second alternative link interface. The third alternative link interface comprises a first connection 256, such as an RS-232 connection, along with radio-frequency circuitry 258 for converting signals into radio frequency output and for accepting radio frequency input. A radio frequency interface 259 may also be included as part of the third alternative link interface.

The three alternative link interfaces described above are merely examples, and additional means for implementing the link interface between the data network telephone 208a and the PID 210a may also be used. Although three link interfaces are shown in FIG. 3, there may be only one such interface in the data network telephone 208a. More than one link interface may be included to improve flexibility and to provide redundancy in case of failure of one of the link interfaces.

The user interface circuitry 260 includes hardware and software components that access the functions of the handset, display, and keypad to provide user input and output resources for functions in the processor 240. The user interface circuitry includes a display interface 262, a keypad interface 264, an audio output interface 265, and an audio input interface 267.

The audio input interface 267 may receive voice signals from a microphone or other audio input device and convert the signals to digital voice information. The conversion preferably conforms to the G.711 ITU Standard. Further processing of the digital signal may be performed in the audio input interface 267, such as providing compression (e.g. using G.723.1 standard) or providing noise reduction, although such processing may also be performed in the processor 240. Alternatively, the audio input interface 267 may communicate an analog voice signal to the processor 240 for conversion to digital information within the processor 240.

The audio output interface 265 receives digital information representing voice from the processor 240 and converts the information to audible sound, such as through a magnetic speaker. In one embodiment, the audio output interface 265 receives information in the form of G.711, although other processing such as decompression may be performed in the audio output interface 265. Alternatively, the processor 240 may convert digital information to analog voice signals and communicate the analog voice signals to the audio output interface 265.

The keypad interface 264 and the display interface 262 include well-known device interfaces and respective signal processing techniques. The user interface circuitry 260 may support other hardware and software interfaces. For example, a videophone implementation might also include a camera and monitor. The data network telephones of the present invention are not limited to telephones or videophones—additional user interface types, for example, such as the ones needed for computer games, are also contemplated as being within the scope of the present invention. In addition, some of the features described here, such as the display interface 262, are optional and serve to enhance the functionality of the first data network telephone 208a.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also may include an operating system, and application and communications software to implement the functions of the data network telephone 208a. The operating system may be any suitable commercially available embedded or disk-based operating system, or any proprietary operating system.

The processor 240 includes a media engine 241 and a signaling stack 243 to perform the primary communications and application functions of the data network telephone 208a. The purpose of the signaling stack in the exemplary data network telephone 208a is to set up, manage, and tear down a call. During the setup phase, a user may use the keypad to enter a user identifier to call. Alternatively, a PID such as PID 210a may transmit the user identifier of the party across the first link 209a. The signaling stack 243 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice-over-data channel is established. During the management phase, for example, other parties may be invited to the call if needed. During the tear down phase, the call is terminated.

The signaling protocol used in the data network telephone 208a in FIG. 3 is the SIP protocol. In particular, the signaling stack implements a User Agent Client 244 and a User Agent Server 242, in accordance with the SIP protocol. Alternative signaling protocols, such as the ITU-T H.323 protocol, MGCP, MEGACO, and others, may also be used to implement the present invention.

Once the call is set up, the media engine 241 manages the communication over one or more data communications channels using network transport protocols and the network interface 270. The media engine 241 sends and receives data packets having a data payload for carrying data and an indication of the type of data is being transported. The media engine 241 in the data network telephones 208a may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter. Similar procedures may be performed for other types of data, such as graphical data, or for data used in PID applications such as email, contacts data, calendar data, other non-voice sound data, interactive game data, etc.

The media engine 241 may also include hardware and software components for performing registration functions 247, voice-over-data functions 249, display data functions 251, and keypad output functions 253. The media engine 241 processes data that is received from the network 212, and data to be sent over the network 241.

For data that is received from the network 212, the media engine 241 may determine from the type of data in the packet (such as by examining a packet header) whether packets contain sampled voice signals or other data types. Packets containing sampled voice signals are processed by the voice-over-data function 249. The voice-over-data function 249 preferably conforms to a protocol for formatting voice signals as digital data streams. While any suitable protocol may be used, the media (i.e. the voice signal) is preferably transported via the Real Time Protocol (RTP), which itself is carried inside of UDP (User Datagram Protocol). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

Packets containing data for use in registering the data network telephone 208a with a network telephony service are processed by the registration function 247. By registering the data network telephone 208a, a user may establish with the network telephony connection server 150 that calls addressed to the user's user identifier may be connected to the data network telephone 208a. Registration may occur when the data network telephone 208a sends a request to register to a service provider host, such as the network telephony connection server 150. The service provider host may respond by setting the user's user identifier to correspond to the telephone identifier of the data network telephone 208a, and by acknowledging the request with a status message to the data network telephone 208a. In one embodiment, a request to register the data network telephone 208a to a default user is automatically sent during power-up of the data network telephone 208a.

Other features may be added to the registration functions 247, or implemented as extensions to the registration functions 247. For example, the first data network telephone 208a may be provisioned to provide selected network telephony services by establishing a data connection with a service provider, requesting the selected services, and receiving data that ensures that the services have been successfully provisioned. Such services may include, for example, caller identification, call forwarding, voice mail and any other services offered by the network telephony service provider to enhance the capabilities of the first data network telephone 208a. One advantage of provisioning functions is that services may be ordered for temporary use in a manner convenient to the user.

Packets containing data for display on a display device of the data network telephone 208a are processed by the display data function 251. The display data function 251 may be used for displaying, for example, the names and user identifiers of other parties to the call, the status of the telephone call, billing information, and other information.

For data to be sent over the data network 212, the media engine 241 formats the data as data packets in accordance with a selected protocol. The selected protocol is preferably a protocol that is supported by data network telephones that will receive the data being transported.

The voice-over-data function 249 formats voice samples according to the protocol used by the receiving data network telephone. In one preferred embodiment, the voice over data function 249 formats voice samples as RTP packets. The registration function 247 and the keypad output function 253 may control the transport of data that does not represent voice signals.

The data network telephones 208b and 218a are preferably similar or identical to the data network telephone 208a. For each of the data network telephones 208a–b and 218a, many of the features described in FIG. 3 are optional and their inclusion depends on the services to be offered.

5. The Portable Information Devices (PIDs)

Figure 4:
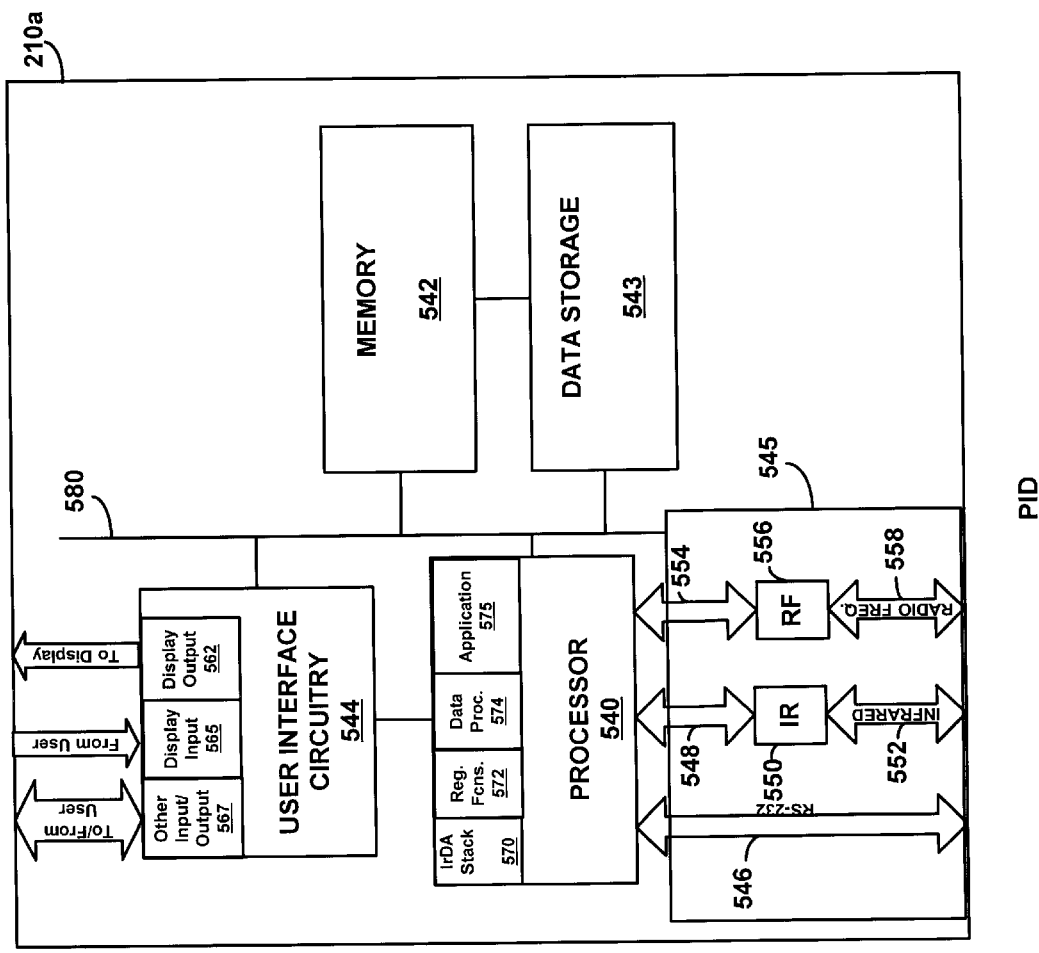
FIG. 4 is a block diagram of a PID according to an exemplary embodiment of the present invention.

FIG. 4 is a block diagram showing the exemplary PID 210a that can communicate via the link 209a with the data network telephone 208a connected to the LAN 212. The PID 210a may be linked to the data network telephone 208a through a link interface 545. A bus 580 may be used to connect the point-to-point interface 545 with a processor 540, a memory 542, data storage 543, and user interface circuitry 544.

The link interface 545 shown in FIG. 4 illustrates three alternative link interfaces for establishing a link to a data network telephone, such as the data network telephone 208a.

A first link interface 546 includes an RS-232 serial connection and associated coupling hardware mechanisms. The first alternative link interface 546 may, for example, be for coupling with a PDA docking cradle, in which information can be transferred between the PDA and the data network telephone 208a. The second alternative link interface comprises a first connection 548, such as an RS-232 serial connection, along with infrared circuitry 250 for converting signals into infrared output and for accepting infrared input. An infrared interface 552 may also be included within the second alternative link interface. The third alternative link interface comprises a first connection 554, such as an RS-232 connection, along with radio-frequency circuitry 556 for converting signals into radio frequency output and for accepting radio frequency input. A radio frequency interface 558 may also be included as part of the third alternative interface. The radio interface 554/556/558 may be implemented according to the Bluetooth specifications, described at www.bluetooth.com.

The three alternative link interfaces described above are merely examplary, and additional means for implementing the interface between the PID 210a and the data network telephone 208a may also be utilized. Although three link interfaces are shown in FIG. 4, there may be only one such interface in the PID 210a. More than one link interface may be included to improve flexibility and to provide redundancy in case of failure of one of the link interfaces.

The user interface circuitry 544 includes hardware and software components that provide user input and output resources for functions in the processor 540. The user interface circuitry includes a display output 562, a display input 565, and an additional input/output interface 567.

The display output 562 preferably receives digital information representing graphical data from the processor 540 and converts the information to a graphical display, such as text and/or images, for display on a display screen, for example.

The display input 565 may receive data inputs, such as graphical data inputs, from a user of the PID 210a. The graphical data inputs are preferably entered by the user with a stylus on a pressure-sensitive display screen, and may include text, drawings, or other objects that are capable of being graphically presented.

The additional input/output interface 567 allows the user to enter other types of data besides graphical data into the PID 210a. For example, audio data, additional graphical data, or additional input, such as video camera input for example, may be entered through the additional input/output interface 567. The data may also include data formatted for operation with particular applications on the PID. For example, email data, calendar data, contacts data, database data, spreadsheets, notes, game data, etc. may also be entered. Touch-sensitive screen buttons are an exemplary method for a user to enter control data into the PID 210a.

The processor 540 may include an operating system, as well as application and communication software to implement the functions of the PID 210a. The operating system may be any suitable commercially available operating system, or any proprietary operating system. The operating system and software may be stored on data storage 543, in the memory 542, or the may be embedded in the processor 540. Although the processor 540 is shown connected to the data storage 543 through a bus 580, other configurations may also be used. Similarly, the memory 542 may be configured other than as shown in FIG. 4, and may be embedded within the processor 540.

The PID 210a is able to send data to and receive data from the data network telephone 208a across a point-to-point link, such as the point-to-point link 209a shown in FIG. 1. A user enters PID data at the display input 565. The graphical data may be processed in the user interface circuitry 544 or it may go directly to the processor 540 or the memory 542. The processor 540 may also perform processing functions, such as compression.

A PID data application may be used to perform functions that may implement the display input, the display output, and the processing functions. For example, a contacts application may be used to accept and maintain user input consisting of information about the user's personal or business contact. The information, or contacts data is provided by the user at the display input 565 with a stylus on the display screen of a PDA. The contacts application could then display the contacts data through the display output 562 to enable the user to see a visual representation of the user input.

If the user desires to share the contacts data with a second user on the system 200, where the second user is using a second PID such as PID 220a, the contacts data from the contacts application can be transmitted through one of the point-to-point interfaces 545, allowing the data to be received by the data network telephone 208a. An application in the data network telephone 208a receives the contacts data across the point-to-point link, and the contacts data is prepared for transmission across the data network 206, such as by the media engine 241 shown in FIG. 3. Preferably the contacts data is converted to data packets and is communicated on a data channel across the LAN 212 through the router 228 across the data network 206 through the second router 238 across the cable network 214 to the third data network telephone 218a. The third data network telephone 218a converts the data packets received on the data channel into the contacts data. The contacts data is then transmitted across a point-to-point link to the second PID 220a, where it may be displayed on a display screen on the PID 220a. The PID 220a may contain a similar contacts program as that which was referenced to the PID 210a, allowing the user of the PID 220a to modify the information and transmit the modifications back across the point-to-point link to the third data network telephone 218a across the cable network 214 through the second router 238 across the data network 206 through the first router 228 across the LAN 212 to the first data network telephone 208a across the point-to-point link and back to the first PID 210a.

The point-to-point link 209a may be a serial bit stream between an application in the first PID 210a and an application in the first data network telephone 208a. For example, the link 209a could be an infrared link that is implemented with minimal stack interpretation. However, the link 209a between PID 210a and the first data network telephone 208a can alternatively be implemented as an infrared link using all or parts of a specialized protocol, such as the Infrared Data Association (IrDA) protocol stack, where data is interpreted through the stack between application-layer processes at each end of the link.

Figure 5:
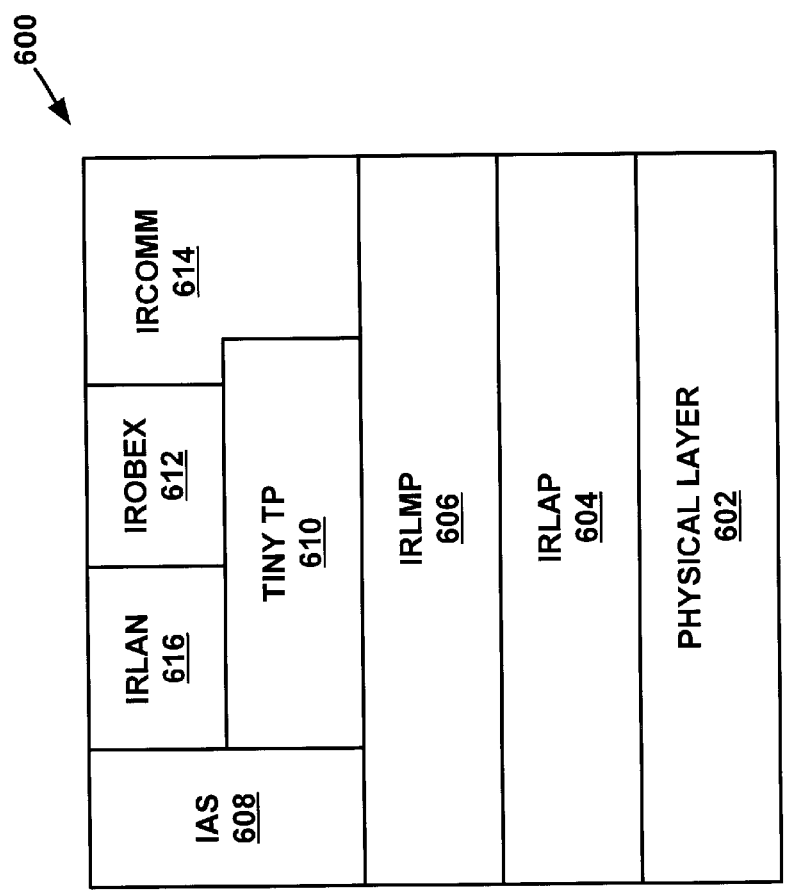
FIG. 5 is a stack layer diagram showing the layers of an IrDA stack.

FIG. 5 is a protocol diagram illustrating the layers of the IrDA protocol stack. An IrDA stack is implemented at each of the connection endpoints of an IrDA link. For example, the first PID 210a and the first data network telephone 208a could each implement an IrDA protocol stack to enable the link 209a. As a second alternative, two PIDs, such as the first PID 210a and the third PID 218a, may each contain an IrDA stack. In the second alternative, the communications between the PIDs and the data network telephones might take place without the assistance of IrDA. For example, IrDa data from the first PID 210a might be transmitted across the link 209a as a serial stream of data to the first data network telephone 208a, which might treat the IrDA data like any other data received from the first PID 210a. The first data network telephone 208a could then assemble the IrDA data into packets, such as TCP/IP packets for transport across the access and data networks to the third data network telephone 218a. The third data network telephone 218a may disassemble the packets and forward the IrDA data (without interpreting the IrDA portions) across the link 219a to the third PID 220a. The third PID 220a could then process the IrDA information received across the networks.

The required layers of an IrDA protocol stack are the physical layer 602, the IrLAP layer 604, the IRLMP layer 606 and the IAS layer 608. The physical layer 602 specifies optical characteristics of the link, encoding of data, and framing for various speeds. The IrLAP (Link Access Protocol) layer 604 establishes the basic reliable connection between the two ends of the link. The IrLMP (Link Management Protocol) layer 606 multiplexes services and applications on the IrLAP connection. The IAS (Information Access Service) layer 608 provides a directory or "yellow pages" of services on an IrDA device.

The IrDA protocol also specifies a number of optional protocol layers, these protocol layers being TinyTP 610, IrOBEX 612, IrCOMM 614 and IrLAN 616. TinyTP (Tiny Transport Protocol) 610 adds per-channel flow control to keep traffic over the IrDA link moving smoothly. This important function is required in many cases. IrOBEX (Infrared Object Exchange protocol) 612 provides for the easy transfer of files and other data objects between the IrDA devices at each end of the link. IrCOMM 614 is a serial and parallel port emulation that enables existing applications that use serial and parallel communications to use IrDA without change. IrLAN (Infrared Local Area Network) 616 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "IrDA 'IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at http://www.irda.org/standards/specifications.asp and is incorporated by reference herein.

The IrDA protocol stack can be implemented at just the PID devices at the endpoints with the intermediate phones and networks simply providing a tunnel for the media stream attendant to the infrared links. Since PIDs, such as the Palm PDA, already have an IrDA stack implemented in them to support their infrared link to other devices and the benefits of the IrDA stack are already available. By using the layers of the IrDA protocol stack, the PID applications and the base applications in the phones can be simplified as the IrDA protocol layers take over certain functionalities. For example, the IrOBEX layer in each IrDA protocol stack can be used to transfer text and graphics object files, such as electronic business cards or whiteboard graphics, end-to-end between PID devices connected via data connected data network telephones.

With the IrDA stack being implemented only in the PIDs and not in the phones, only a small level of delay is introduced for stack interpretation by each PID and the connection provided is largely transparent to the applications in the PID devices, i.e. little or no modification to existing user applications in the PIDs is required. This approach may be more suitable for delay sensitive applications, such as interactive games involving the transfer of data between user applications in each PID.

It should be noted that the IrDA stack is written for a single infrared point-to-point interface and not for an infrared-to-network-to-infrared interface. As a result, the timers and retransmission schemes implemented in view of the single infrared point-to-point interface may not function properly for the extended network interface.

Alternatively, IrDA stacks can be implemented in the phones as well. By implementing IrDA stacks in the phones, the timing of the infrared interface is unaffected by a network delay. Also, additional functions and features can be implemented in the phones. For example, the phones can implement challenge and authentication where the phone requires the user, through the PID, to enter a password or other information to authenticate an authorized user. Similarly, the PID may also be used to transmit commands to the phone and receive status information via the IrDA stack. The approach taken will depend upon the requirements of the design and the particular application.

6. Providing Telephony and PID Data Exchange

Figure 6:
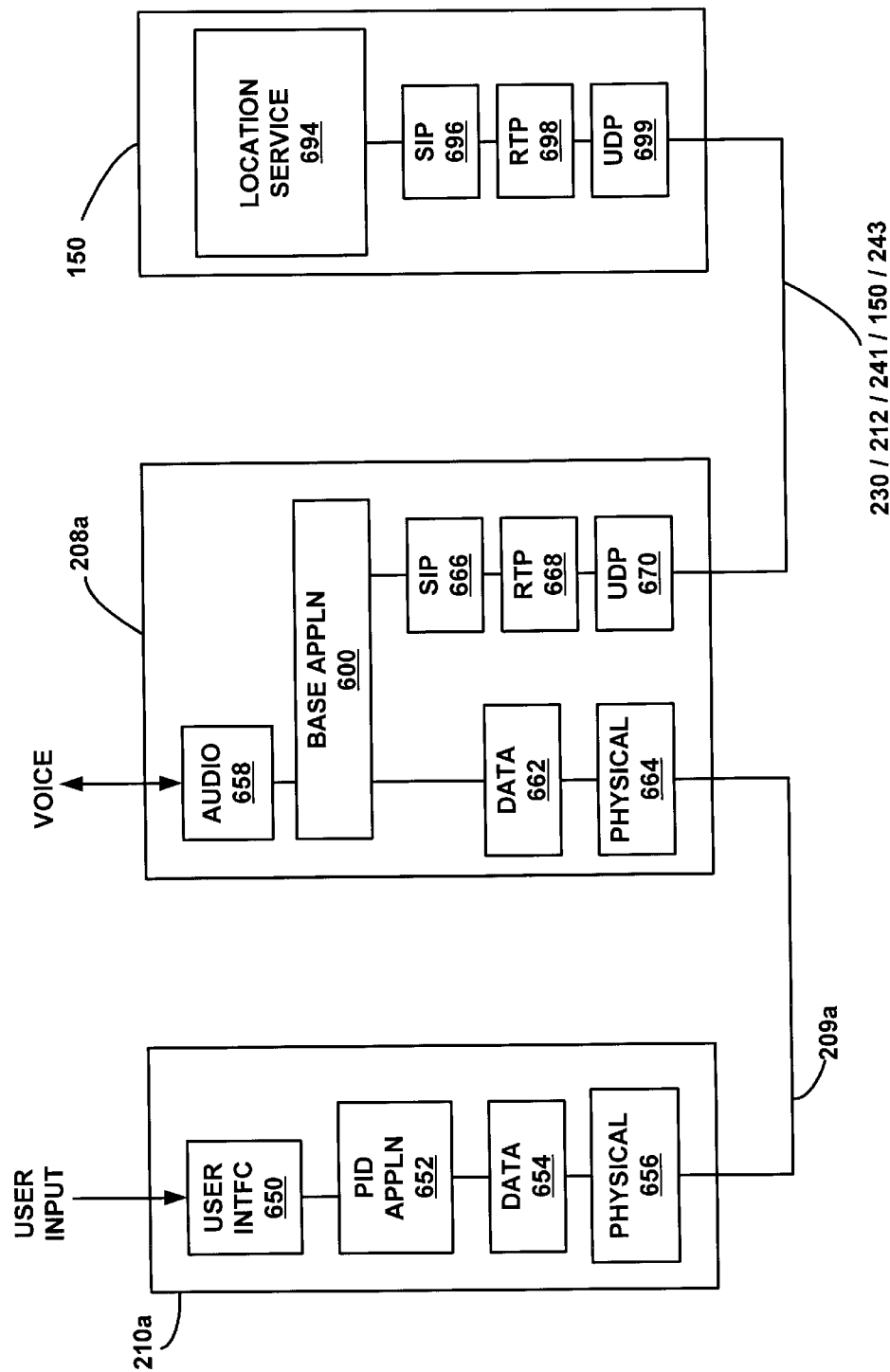
FIG. 6 is a block and stack layer diagram illustrating an embodiment of the protocol stacks in an exemplary embodiment of a PID linked to a data network telephone.

FIG. 6 is a functional block diagram and protocol stack diagram illustrating an embodiment of the protocol stacks in the first PID 210a and the first data network telephone 208a that support link 209a. In the infrared RS-232 embodiment, the link interface circuitry 545 in the first PID 210a provides the physical layer 656, such as that specified by the Infrared Data Association (IrDA), that connects via link 209a to the link interface circuitry 260 implementing a physical layer 664 in the first data network telephone 208a. The data link layer 654 in the first PID 210a provides data link control for link 209a in transferring data to and from a PID application client 652. Similarly, the first data network telephone 208a includes a data link layer 662 and a base application server 600 that is configured to synchronize connection and other functions with the PID application 652 in the first PID 210a.

When PID 210a is activated, either through power-up or through a user input at the user interface 650, the synchronization application client 652 in the PID 210a may send the user's SIP URL across the link 209a to the first data network telephone 208a, where it is received by the synchronization application server 600. The synchronization application server 600 sends the SIP URL received from the PID 210a across connection 230 and the Ethernet LAN 212 through connection 243 to the network telephony connection server 150. The network telephony connection server 150 may store the SIP URL and the IP address of the associated data network telephone 208a in the SIP database 152 so that the SIP URL is listed as being resident at the IP address of the data network telephone 208a. (If the network telephony connection server 150 uses a location server for registration/location tasks, the registration information might instead be stored with such a location server). SQL (Structured Query Language) is preferred for querying the database. Once the PID 210a is registered with the network telephony connection server 150, calls to the SIP URL for PID 210a (or the user of the PID 210a) will be directed to the data network telephone 208a.

Figure 7:
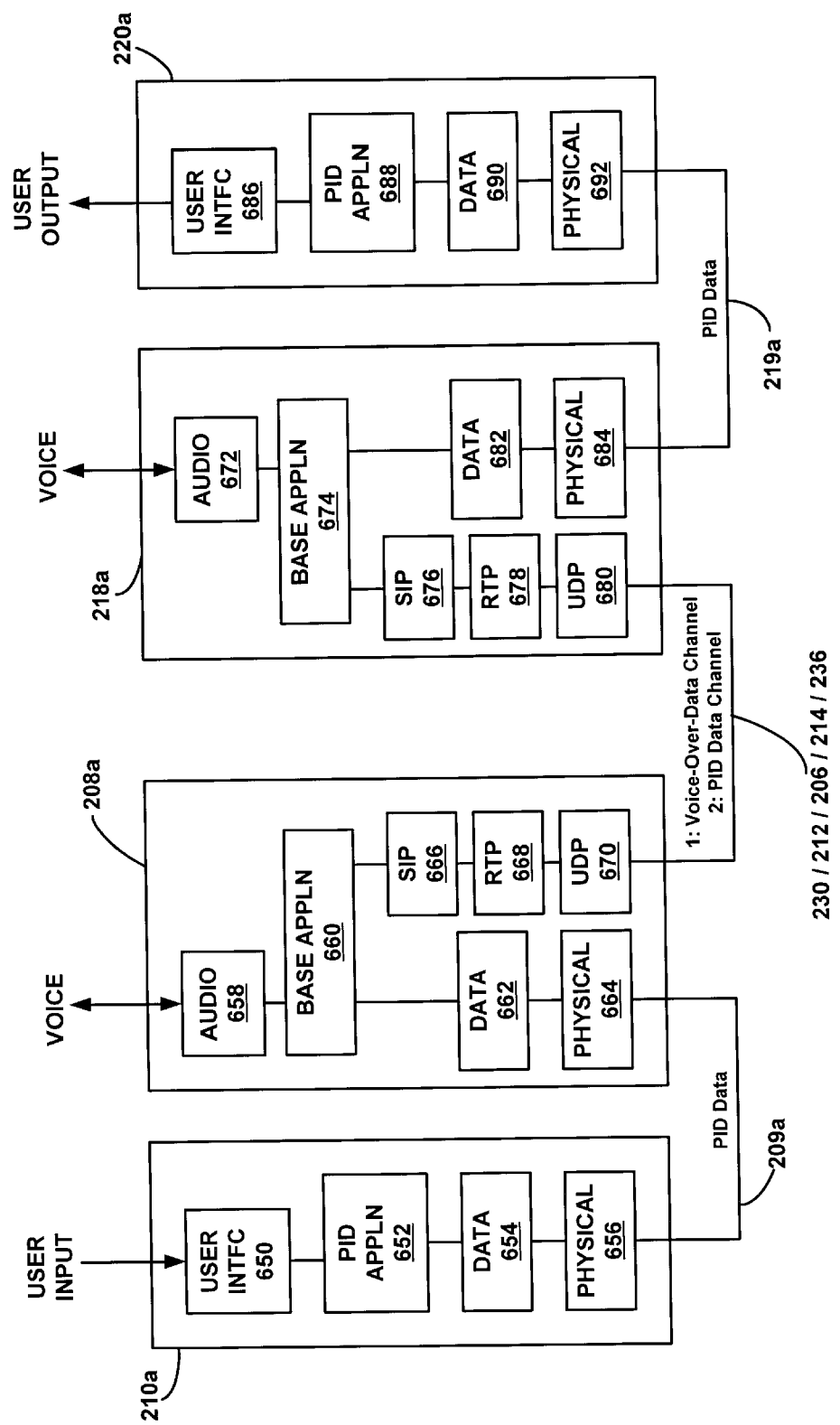
FIG. 7 is block and stack layer diagram illustrating an embodiment of the present invention in which a SIP call may be established.

FIG. 7 is a functional block and protocol stack diagram illustrating an embodiment of the present invention where a SIP connection is established from the first data network phone 208a to the third data network phone 218a through network connection 230, first access network 212, data network 206, second access network 214 and network connection 236. The routers 228 and 238, and associated connections 232a–b and 234a–b, are not shown to simplify the block diagram representation.

The diagram of FIG. 7 shows how PID data from a PID application can be passed from one PID to another PID in one aspect of the present invention. The PID application 652 in PID 210a is configured to send PID data input through the user interface 650 through link 209a to base application 660 in the first data network phone 208a. In this embodiment, base application 660 is configured to define data channels for transport to the third data network telephone 218a.

Multiple data channels in SIP may be defined through the Session Description Protocol described in RFC 2327, herein incorporated by reference. Included in a SIP INVITE request for a connection are options for the requested connection that describe the number and type of media streams. Each media stream is described by a "m=" line in the INVITE request. For example, a request for a connection that includes an audio stream and a bidirectional video stream using H.261 might look like this:

TABLE 1 v=0
o=alice 2890844526 2890844526 IN IP4 host.anywhere.com
c=IN IP4 host.anywhere.com
m=audio 49170 RTP/AVP 0
a=rtpmap:0 PCMU/8000
m=video 51372 RTP/AVP 31
a=rtpmap:31 H26/190000

If the called device includes functionality to receive the connection as described in Table 1, then the called device will respond to the INVITE request with a 200 OK response that includes the same option values. If the called device or party is unable or unwilling to receive such a connection, then it will respond with alternative option values for the connection. See RFC 2543 for further details regarding the negotiation of connection parameters in SIP.

In FIG. 7, a first data channel for voice data and a second data channel for PID data have been negotiated by the base applications 660 in the first data network telephone 208a and the base application 674 in the second data network telephone 218a. The base applications 660 and 674 transfer voice data between the AUDIO applications, such as applications including G.711 encoders, in each phone via the first data channel. The base application 660 in phone 208a is also configured to send the PID data received via link 209a from PID 210a to the base application 674 in phone 218a via the second data channel. The base application in phone 218a is configured to forward the PID data received via the second data channel to PID 220a via link 219a. The PID application 688 in PID 220a then outputs the user data received from phone 218a to the user interface 686 for output to the user of PID 220a. Depending on the particular application being used in the PID 220a, the PID data may also be used in application functions.

The PID data in FIG. 7 can take a variety of forms. For example, the PID data can be a text file containing information about the user of PID 210a, such as an electronic business card. The PID data can also be drawing data generated by graphical applications in the PIDs 210a and 220a whereby a user drawing on a touchscreen of the user interface 650 in PID 210a generates corresponding PID data that is transmitted via the second data channel to PID 220a for display on the user interface 686 of PID 220a. The media description for the media stream can be defined during connection setup to establish a connection appropriate to the type of data being transferred. These examples represent just a few of the applications for this aspect of the present invention and should not be viewed as limiting the present invention.

In one embodiment, RTP data packets for two or more types of data are exchanged between the first data network telephone 208a and the second data network telephone 218a according to one of three possible methods. In the first method, one RTP data channel (or RTP stream) on UDP carries data packets in which both data types are present in a single split packets. Each such split packet contains (1) a source port number and a destination port number in the UDP portion, and (2) a special payload sequentially including each of the data types in the RTP portion. The special payload type can be defined in the SDP described with reference to FIG. 6. Other information is also contained in each packet as well. In the second method for transmitting two or more data types, a separate RTP over UDP data channel is created for each of the different data types, and the RTP header indicates which type of data is contained in each packet. For example, voice data coded as G.711 might be assigned a payload type code of 0, while PID data is assigned a payload type code of 190. In the third method for transmitting two or more data types, a single RTP/UDP data channel (RTP/UDP stream) is created that contains data packets of two or more different types. In this method, the data types are identified in a payload type field in the RTP header of each packet, enabling an underlying application to identify which data packets are voice data packets and which data packets are PID data packets, for example.

C. Providing PID Data Exchange Concurrent with Voice Services

Figure 8:
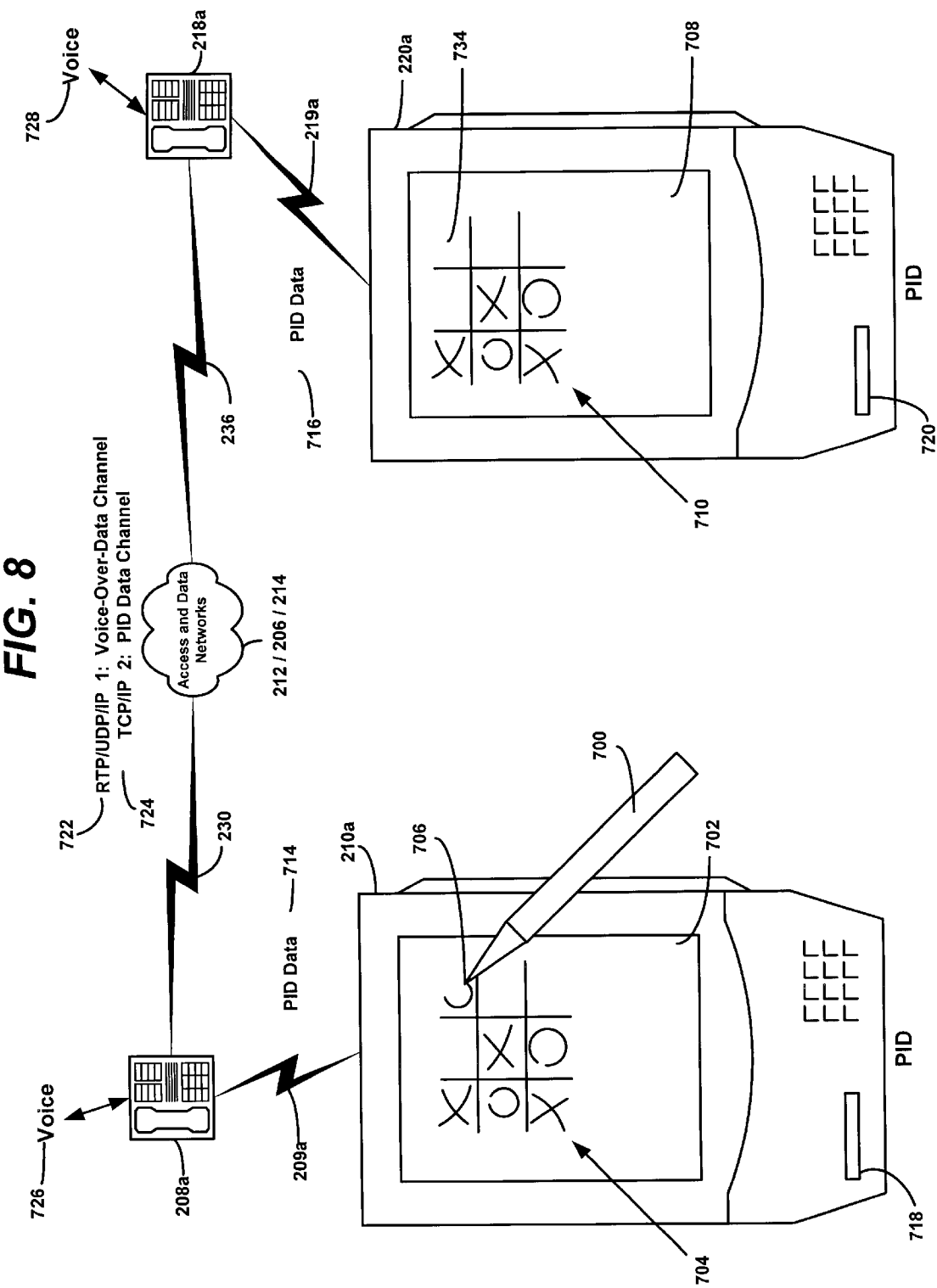
FIG. 8 is a combined block and pictorial diagram showing a system for providing PID data exchange according to a first embodiment of the present invention.
Figure 9:
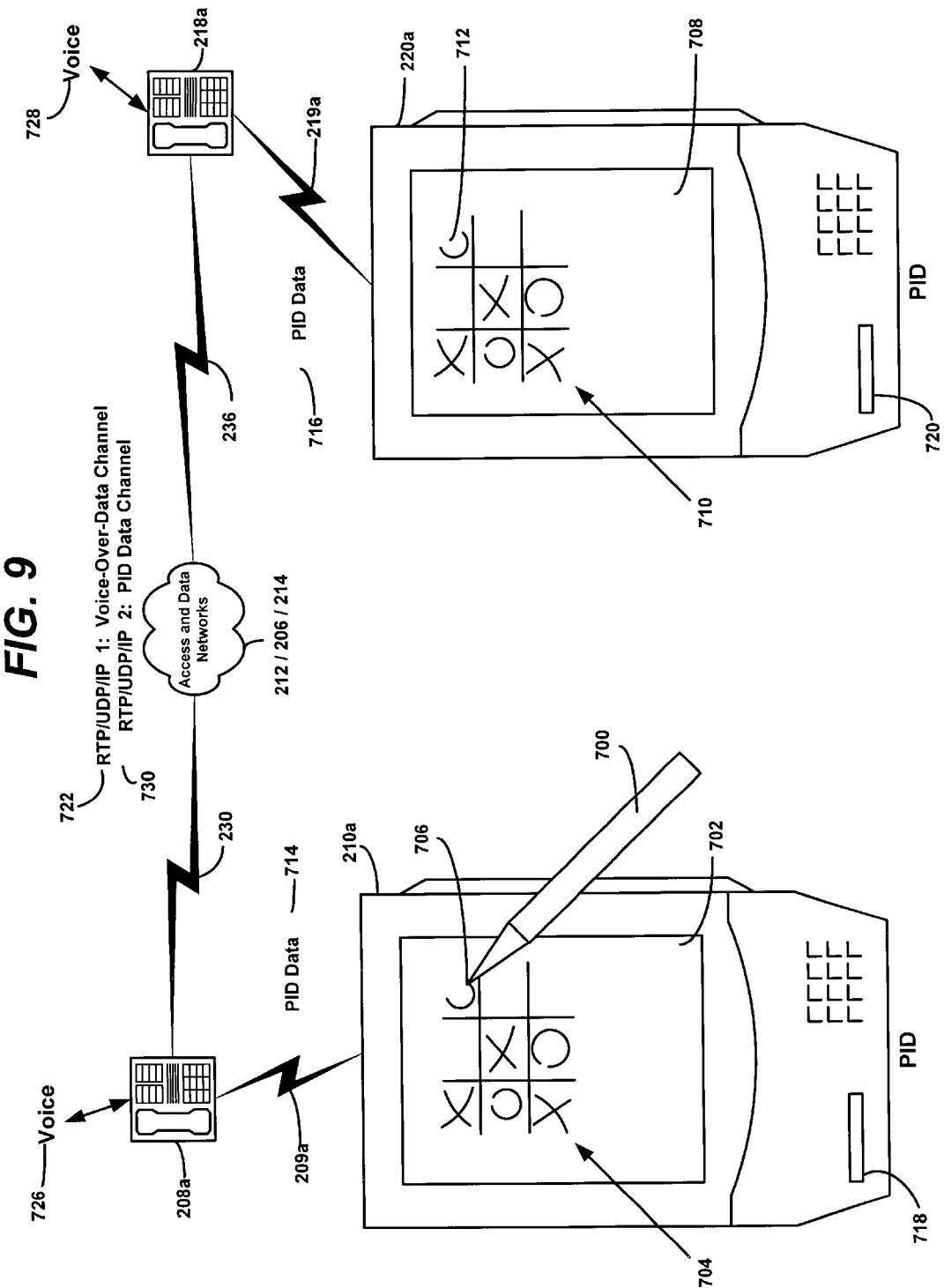
FIG. 9 is a combined block and pictorial diagram showing a system for providing PID data exchange according to a second embodiment of the present invention.
Figure 10:
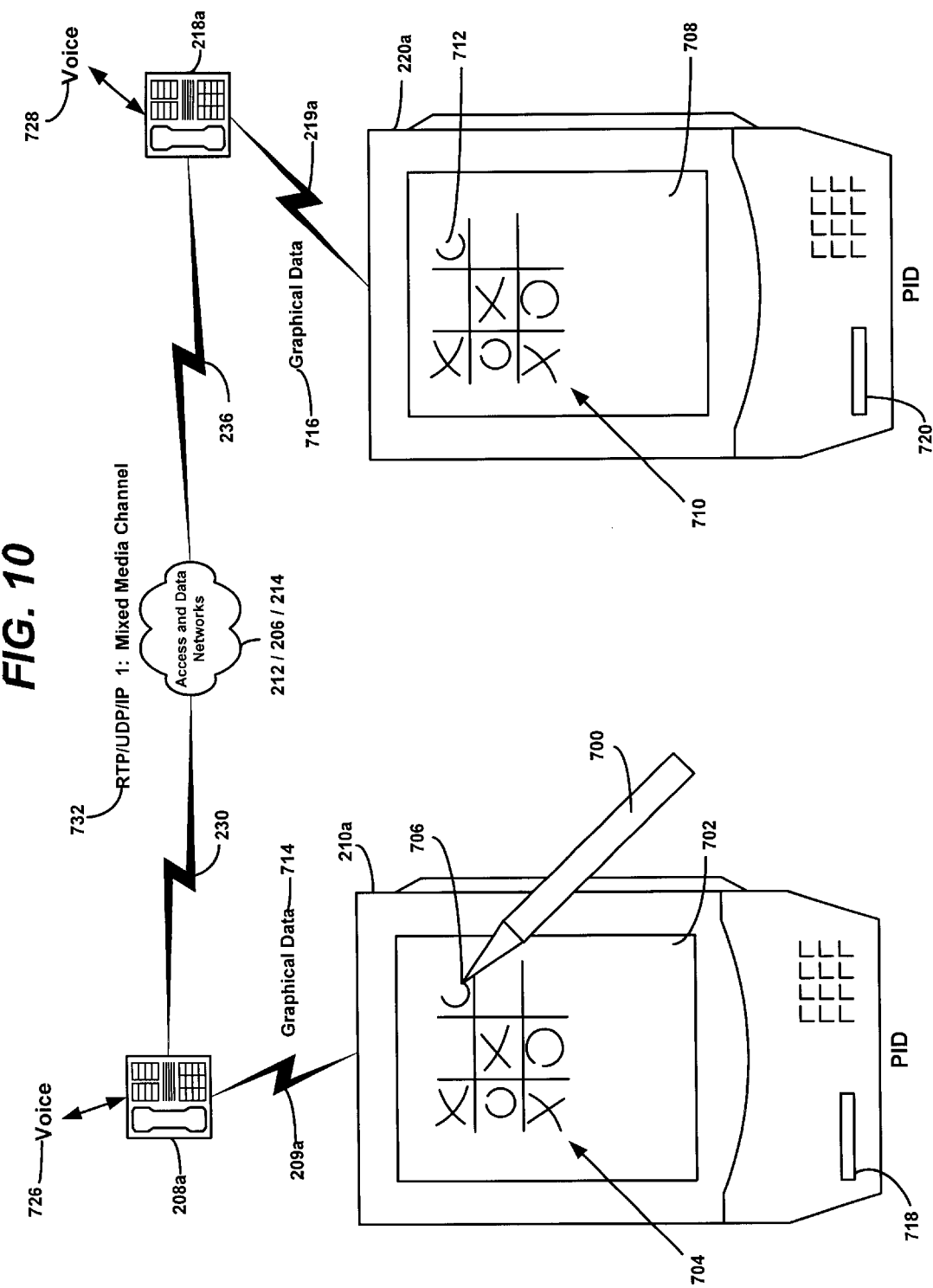
FIG. 10 is a combined block and pictorial diagram showing a system for providing PID data exchange according to a third embodiment of the present invention.

FIGS. 8–10 are block diagrams illustrating exemplary embodiments of the present invention. Various elements within FIGS. 8–10 are similar to or identical to elements in FIG. 2, and accordingly share common reference numerals. Although only two PIDs 210a and 220a are shown in FIGS. 8–10, this is not intended to be limiting. More than two PIDs may be involved in a session. The quantity of PIDs is limited by the bandwidth of the access and data networks, and the characteristics of the data to be utilized in the shared environment. To communicate with additional PIDs, additional data channels are created by the data network telephones.

1. Non-Continuous PID Data Transmission with Separate Data Channels for PID Data and Voice Data FIG. 8 shows an exemplary embodiment of the present invention in which separate data channels are used for PID data and voice data, and in which PID data may be transmitted on a non-continuous basis. The first PID 210a includes a display screen 702, a stylus 700 that a user can use to enter PID data into the first PID 210a, and an SYNC button 718.

The display screen 702 is shown as a pressure-sensitive display screen in which the stylus 700 can be used to enter PID data 714 into the first PID 210a. In the example shown in FIG. 8, the PID data 714 consists of a drawing 704 that is a tic/tac/toe game. The stylus is being used to draw a modification 706 (an "O") as part of a tic/tac/toe game with a user of the second PID 220a. The second PID 220a also contains a display screen 708, a SYNC button 720, and a stylus, which is not shown in FIG. 8. The display screen 708 on the second PID 220a also displays the drawing of the tic/tac/toe game between the user of the first PID 210a and the user of the second PID 220a.

In the embodiment shown in FIG. 8, the modification 706 to the drawing 704 is not transmitted continuously as the modification is being made by the stylus 700. Instead, the PID data 714, including the modification 706, is only transmitted when the user of the first PID 210a synchronizes the first PID 210a with the first data network telephone 208a. For example, the user may synchronize the first PID 210a by pressing the SYNC button 718 to cause the PID data 714 to be transmitted across the link 209a to the first data network telephone 208a. As a second example, a predefined stylus-stroke may be executed by the user of the stylus 700 to the display screen 702 to cause the PID data 714 to be transmitted to the first data network telephone 208a. An example of a stylus-stroke is a long stroke from the bottom to the top of the display screen 702. In an alternative aspect of this embodiment of the invention, a PID application 652, such as a drawing application, may periodically transmit the PID data 714 at predefined time intervals to the first data network telephone 208a. If the predefined time intervals are short, the transmission of the PID data 714 will approach the appearance of a continuous transmission of the PID data from the first PID 210a to the first data network telephone 208a.

When the first data network telephone 208a receives the PID data 714, an application within the first data network telephone 208a will place the PID data 714 into PID data packets for transmission to the second data network telephone 218a across the access and data networks 212, 206 and 214 (and any associated connections and routers). The second data network telephone 218a then removes the received PID data 716, the PID data packets and transmits the PID data 716 across the second link 219a to the second PID 220a for display on the display screen 708. The PID data packets communicated between the first and second data network telephones 208a and 218a are on a PID data channel 724. In the exemplary embodiment of FIG. 8, the PID data channel 724 is the second of two data channels. A voice-over-data channel 722 is the first data channel between the first data network telephone 208a and the second data network telephone 218a. The voice-over-data channel 722 carries voice-over-data packets assembled by the data network telephones 208a and 218a that contain voice signals 726 and 728 spoken by the users of the PIDs 210a and 220a. As a result of the dual data channels, the users of the PIDs 210a and 220a may participate in a conversation while they are playing their tic/tac/toe game in the example shown.

One advantage of the examples described herein of the present invention is that the PID data is not limited to graphical or image data. The type of data transmitted conforms to the application being used. For example, in the example described above with reference to FIG. 8, the tic-tac-toe game may be played with a tic-tac-toe game application as opposed to simply a drawing program. The tic-tac-toe game may determine the winner and draw the line through the winning row or column. The game may also keep a record of games won v. games lost for each user.

The PID data channel 724 is shown as being transported by using TCP over IP. This is merely one method for transporting the graphical data packets. Other transport protocols may also be used. A TCP/IP implementation may be particularly advantageous for non-continuous graphical data transmission embodiments of the present invention. This is due to TCP's congestion avoidance mechanisms. Therefore, if PID data packets are being lost (which may be the result of a congested network), TCP may reduce the transmission packet size (the window) to alleviate some of the congestion and to provide better performance. By reducing the quantity of PID data on such a congested network, the other network traffic (such as the voice data) should also experience better performance (fewer lost packets, etc.), which can be important for voice data applications. The voice-over-data channel 722 is shown as an RTP/UDP/IP channel. Such a channel will be described in more detail with reference to FIG. 9.

Note that with the non-continuous PID data transmission embodiment of the present invention, when a user inputs PID data into the first PID 210a, the PID data does not appear on the display screen of the second PID 220a until the PID data 714 is transmitted to the first data network telephone 208a. Therefore, in FIG. 8, the user has begun making a modification 706 to the drawing 704, but has not synchronized the PID 210a with the first data network telephone 208a. As a result, the drawing 710 on the display screen 708 of the second PID 220a does not yet contain the modification 706 (see the open box 734). When the user of the first PID 210a has completed the modification 706 and has synchronized the PID 210a with the first data network telephone 208a, the PID data will be transmitted through the data network telephone 208a through the access and data networks 212, 206 and 214, through the second data network telephone 218a and to the second PID 220a in the box 734 on the display screen 708 of the second PID 220a.

2. Continuous PID Data Transmission with Separate Data Channels for PID Data and Voice Data FIG. 9 is a block diagram showing a second exemplary embodiment of the present invention. This embodiment differs from the embodiment illustrated by the example of FIG. 8 because PID data is continuously transmitted from the PID 210a across the first link 209a to the first data network telephone 208a, where it is packetized and transported across the access and data networks to the second data network telephone 218a. At the second data network telephone 218a, the PID data packets are disassembled, and PID data 716 is sent to the second PID 220a for display on the display screen 708 of the second PID 220a. Therefore, the user of the second PID 220a is able to see the modification 712 as the modification 706 is being drawn by the user using the stylus 700 on the first PID 210a, although there may be some network delay and delay due to the packet assembly and disassembly operations.

To accomplish the continuous transmission of PID data 714 from the first PID 210a to the first network communication device 208a, the PID application 652 continuously transmits PID data, such as pixel information, to the data network telephone 208a as the PID data is received by the PID 210a through the user interface 650. The base application 660 in the first data network telephone 208a receives the PID data transmitted by the PID 210*a* and converts the PID data into PID data packets for transmission on a PID data channel 730. The PID data channel 730 is shown as being transported across the access and data network 212, 206, and 214 using the RTP protocol over UDP which is on top of IP. Other protocol implementations may also be used, but the continuous nature of the PID data transmission in the example of FIG. 9 lends itself well to the use of RTP/UDP/IP. Similarly, the voice-over-data channel 722 is also shown as an RTP/UDP/IP channel, to take advantage of the real-time properties of voice data 726 and 728.

3. Continuous PID data Transmission with a Mixed-Media Data Channel for PID data and Voice Data FIG. 10 is a block diagram showing a third exemplary embodiment for providing PID data exchange concurrently with voice services in which PID data 714 is continuously transmitted from the first PID 210*a* to the first data network telephone 208*a* for transport across the access and data networks 212, 206, and 214 to the second data network telephone 218*a*, where PID data 716 is then transmitted to the second PID 220*a* for display on the display screen 708 of the second PID 220*a*. As in the exemplary embodiment shown in FIG. 9, a graphical modification 706 on the first PID 210*a* is continuously transmitted as the modification is being made so that similar representation of the modification 712 appears on the second display screen 708 on the second PID 220*a*, after processing and propagation delays.

The main difference between the embodiment of FIG. 9 and the embodiment of FIG. 10 is that in FIG. 10 PID data 714 and the voice data 726 are transported across a single data channel. The first data network telephone 208*a* receives the voice data 726 and the PID data 209*a* through the user interface circuitry 260 and one of the link interfaces, such as the infrared link interface 252/250/254 as shown in FIG. 3. The processor 240 (or a portion of the processor 240, such as media engine 241) assembles a data packet, such as an RTP packet, in which the payload consists of a portion that represents the voice data 726 and a second portion that represents the PID data 714. The header of the RTP packet contains a "payload type" field, which is a 7-bit field identifying the format of the RTP payload and which determines the payload's interpretation by an application. RTP allows a profile to specify a default static mapping of payload type codes to payload formats. Additional payload type codes may be defined dynamically through non-RTP means. All that is required is that the receiving device, such as the second data network telephone 218*a*, be able to disassemble the mixed media packet into voice data 728 and PID data 716. Although RTP has been described for implementing the mixed media, data packets, other similar protocols may also be used.

While the invention has been described in conjunction with presently preferred embodiments of the invention, persons of skill in the art will appreciate that variations may be made without departure from the scope and spirit of the invention. For example, the access networks shown in FIG. 2 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for exchanging data on a data network telephony system comprising:

a data network to provide data connectivity for a plurality of data communications channels using data transport protocols;

first and second data network telephones connected to the data network, each data network telephone operable to communicate a voice signal as voice-over-data packets on a voice-over-data channel, the voice over data channel being one of the plurality of data communications channels on the data network, the data network telephones operable to convert voice-over-data packets communicated on the voice-over-data channel to voice signals;

a first portable information device comprising a first graphical user interface and a first data network telephone interface, the first graphical user interface operable to accept and display PID data, the first data network telephone interface operable to communicate PID data to and from the first data network telephone; and a second portable information device comprising a second graphical user interface and a second data network telephone interface, the second graphical user interface operable to accept and display PID data, the second data network telephone interface operable to communicate PID data to and from the second data network telephone, wherein the first PID communicates PID data to the first data network telephone, the first data network telephone communicates the PID data to the second data network telephone, and the second data network telephone communicates the PID data to the second PID.

2. The system of claim 1 wherein:

at least a first and second user communicate on the voice-over-data channel and the PID data channel, each user identified by a user identifier that includes a unique sequence of alpha numeric elements.

3. The system of claim 2 wherein each data network telephone includes a device identifier that corresponds to the user identifier.

4. The system of claim 3 wherein the device identifiers include Internet Protocol (IP) addresses.

5. The system of claim 3 wherein the user identifiers include Session Initiation Protocol (SIP) addresses.

6. The system of claim 3 wherein the user identifiers include E.164 telephone numbers.

7. The system of claim 1 further comprising:

a network telephony user database connected to the data network to store a user identifier and a telephone identifier corresponding to the user identifier for each of a plurality of users, wherein:
the user identifier includes a first sequence of alphanumeric elements that identify a corresponding user;
the telephone identifier includes a second sequence of alphanumeric elements that identifies a corresponding data network telephone; and a network telephony connection server operable to receive a request message from the first data network telephone to initiate the voice over data channel and the PID data channel with the second data network telephone, and to send a response message in response to the request message.

8. The system of claim 7, wherein the response and request messages are communicated by the network telephony connection server in accordance with the Session Initiation Protocol (SIP).

9. The system of claim 7, wherein the response and request messages are communicated by the network telephony connection server in accordance with the H.323 Protocol.

10. The system of claim 7 wherein the response and request messages are communicated by the network telephony connection server in accordance with the MGCP protocol.

11. The system of claim 7 wherein the response and request messages are communicated by the network telephony connection server in accordance with the MEGACO protocol.

12. The system of claim 7 wherein:
   the request message includes a callee user identifier; and
   wherein the network telephony connection server determines the telephone identifier for the callee user identifier and includes the telephone identifier in the response message.

13. The system of claim 7 wherein:
   the request message includes a callee user identifier; and
   wherein the network telephony connection server determines the telephone identifier for the callee identified in the callee user identifier and sends the response message to the callee at the telephone identifier.

14. A data network telephone for transferring data between a personal information device (PID) and a network, the device comprising:
   means for communicating with the PID;
   means for communicating with the network;
   means for setting up a connection to another network communication device responsive to receiving a connection request command from the PID through the PID communication means, where the connection request command includes a user identifier value corresponding to the another network communication device and where the connection is defined to have at least one media stream for transferring data from the PID to another PID; and
   means for receiving a selected data object from the PID and transmitting the selected data object through the media stream of the connection to the another network communication device.

15. The network communication device of claim 14, where the means for setting up a connection to another network communication device includes:
   means for sending a query for the user identifier value to a location server;
   means for receiving a response from the location server, where the response includes a network address for the another network communication device; and
   means for connecting to the another network communication device using the network address from the response.

16. The network communication device of claim 15, where the means for connecting to the another network communication device further comprises Session Initiation Protocol (SIP) means for setting up the connection.

17. The network communication device of claim 16, where the means for connecting to the another network communication device includes means for defining the one media stream using a Session Description Protocol (SDP).

18. The network communication device of claim 15, further including means for receiving a registration request having another user identifier value from the PID and, responsive thereto, sending a registration update message, having the another user identifier value and another network address corresponding to the network communications device, to the location server.

19. The network communication device of claim 14 further including protocol means for communicating with a peer protocol means in the another PID.

20. The network communication device of claim 19, where the means for communicating with the PID further comprises an infrared communications link and where the protocol means further comprises an IrDA protocol stack.

21. The network communication device of claim 14, where the means for setting up a connection to another network communication device is further configured to set up another media stream for transferring data between the network communication device and the another network communication device simultaneous to the transfer of data between the PID and the another PID through the one media stream.

22. A method for transferring data between first and second personal information devices (PIDs) across a network, the method comprising the steps of:
   providing a first communication link between the first PID and a first network communication device coupled to the network;
   providing a second communication link between the second PID and a second network communication device coupled to the network;
   establishing a connection through the network between the first and second network communication devices, where the connection includes at least one media stream for transfer of data between the first and second PIDs;
   selecting a data object in the first PID;
   transmitting the selected data object from the first PID to the first network communication device over the first communication link;
   transferring the selected data object from the first network communication device over the media stream to the second network communication device; and
   transmitting the selected data object from the second network communication device to the second PID over the second communication link.

23. The method of claim 22, the method further including the step of providing a location server accessible via the network and where the step of establishing a connection through the network further comprises:
   sending a connection request from the first PID to the first network communication device, where the connection request includes a user identifier value corresponding to the second PID;
   responsive to the connection request, sending a query including the user identifier value to the location server;
   searching in the location server for an entry matching the user identifier value, where the matching entry includes a network address value corresponding to the second network communication device;
   when the matching entry is found, sending a response message with the network address value corresponding to the second network communication device from the location server to the first network communication device; and
   setting up the connection from the first network communication device to the second network communication device using the network address value corresponding to the second network communication device.

24. The method of claim 23, the method further including the steps of:
sending a registration request including the user identifier value from the second PID to the second network communication device via the second communication link;
responsive to the registration request, sending a registration update message including the user identifier value from the second network communication device to the location server via the network; and
responsive to the registration update message, storing the matching entry having the user identifier value and the network address of the second network device in the location server.

25. The method of claim 24, where the location server further comprises a redirect server according to an Session Initiation Protocol (SIP).

26. The method of claim 22, the method further including the step of providing a location server accessible via the network and where the step of establishing a connection through the network further comprises:
sending a connection request from the first PID to the first network communication device, where the connection request includes a user identifier value corresponding to the second PID;
responsive to the connection request, sending a query including the user identifier value to the location server;
searching in the location server for an entry matching the user identifier value, where the matching entry includes a network address value corresponding to the second network communication device;
when the matching entry is found, sending a connection set-up message to the network address value corresponding to the second network communication device from the location server; and
setting up the connection between the first network communication device to the second network communication device responsive to the connection set-up message.

27. The method of claim 26, the method further including the steps of:
sending a registration request including the user identifier value from the second PID to the second network communication device via the second communication link;
responsive to the registration request, sending a registration update message including the user identifier value from the second network communication device to the location server via the network; and
responsive to the registration update message, storing the matching entry having the user identifier value and the network address of the second network device in the location server.

28. The method of claim 27, where the location server further comprises a proxy server according to an Session Initiation Protocol (SIP).

29. The method of claim 27, including the step of defining the connection through the network between the first and second network devices using a Session Description Protocol (SDP).

30. The method of claim 22, where the first and second communication links are infrared links.

31. The method of claim 30, further including the steps of:
providing a predetermined protocol stack in the first and second PIDs; and
transferring the selected data object between peer layers of the predetermined protocol stack.

32. A system for transferring data between personal information devices (PIDs) across a network, the system comprising:
a first personal information device (PID) having a communication port, where the first PID is configured to transmit a connection request having a user identifier value through the communication port and where the first PID is configured to transmit a selected data object via the communication port;
a first network communication device having a communication port and a network interface connection coupled to the network, where the first network device is configured to receive the connection request and establish a connection with a second network communication device corresponding to the user identifier value from the connection request, where the connection includes a first media stream for transferring data between PIDs, and where the first network communication device is further configured to receive the selected data object via the communication port of the first network device and send the selected data object through the first media stream.

33. The system of claim 32, where:
the first network communication device is further configured to transmit a query message onto the network that includes the user identification value from the connection request and the first network communication device is configured to receive a response message through the network that includes a network address corresponding to the user identification value and establish the connection using the network address; and
the system further includes a location server having a network connection coupled to the network and a data store for storing entries that relate user identifier values to network addresses, where the location server is configured to receive the query message from the first network communication device that includes the user identifier value and, responsive thereto, search the data store for an entry corresponding to the user identifier value and, when a corresponding entry is found, send a response over the network to the first network communication device that includes the network address value from the corresponding entry.

34. The system of claim 33, where:
the user identifier value is a Session Initiation Protocol (SIP) Universal Resource Locator (URL);
the location server is a SIP location server operating in redirect mode; and
the first network device is configured to define the first media stream using a Session Definition Protocol (SDP).

35. The system of claim 33, where:
the user identifier value is a Session Initiation Protocol (SIP) Universal Resource Locator (URL);
the location server is a SIP location server operating in proxy mode; and
the first network device is configured to define the first media stream using a Session Definition Protocol (SDP).

36. The system of claim 32, where:
the first network communication device is further configured to transmit a query message onto the network that includes the user identification value from the connection request; and the system further includes a location server having a network connection coupled to the network and a data store for storing entries that relate user identifier values to network addresses, where the location server is configured to receive the query message from the first network communication device that includes the user identifier value and, responsive thereto, search the data store for an entry corresponding to the user identifier value and, when a corresponding entry is found, establish the connection between the first network communication device and a network communication device corresponding to the network address value from the corresponding entry.

37. The system of claim 32, where the system includes a second PID coupled to the second network communications device, and where the first network communications device is further configured to establish a second media stream for transferring data between the first and second network communications devices while data is simultaneously transferring between the first and second PIDs via the first media stream.

* * * * *